United States Patent
Mullins, II et al.

(10) Patent No.: US 7,565,625 B2
(45) Date of Patent: Jul. 21, 2009

(54) TOOLBAR SLOT METHOD AND APPARATUS

(75) Inventors: David H. Mullins, II, Kensington, CA (US); Karon A. Weber, San Francisco, CA (US); Maxwell O. Drukman, San Francisco, CA (US); Steven Clay Hunter, San Francisco, CA (US); Christopher M. King, San Francisco, CA (US); Katrina Archer, Vancouver (CA)

(73) Assignee: Pixar, Emeryville, CA (US)

( * ) Notice: Subject to any disclaimer, the term of this patent is extended or adjusted under 35 U.S.C. 154(b) by 414 days.

(21) Appl. No.: 10/841,235

(22) Filed: May 6, 2004

(65) Prior Publication Data

US 2005/0251755 A1 Nov. 10, 2005

(51) Int. Cl.
*G06F 3/00* (2006.01)

(52) U.S. Cl. ............... 715/835; 715/825; 715/826; 715/810; 715/864; 715/827

(58) Field of Classification Search ............... 715/835, 715/825–827, 810, 864
See application file for complete search history.

(56) References Cited

U.S. PATENT DOCUMENTS

| | | | |
|---|---|---|---|
| 5,812,805 A * | 9/1998 | Kitayama et al. | 715/840 |
| 6,232,972 B1 * | 5/2001 | Arcuri et al. | 715/815 |
| 6,857,105 B1 * | 2/2005 | Fox et al. | 715/825 |
| 2004/0221246 A1 * | 11/2004 | Chickles et al. | 715/854 |
| 2005/0204309 A1 * | 9/2005 | Szeto | 715/811 |
| 2005/0251755 A1 * | 11/2005 | Mullins et al. | 715/779 |

OTHER PUBLICATIONS

Microsoft, Word, 1999, Software, 2000, Examiner created screenshots: figs. 1-18.*

* cited by examiner

*Primary Examiner*—David Wiley
*Assistant Examiner*—Ryan Pitaro
(74) *Attorney, Agent, or Firm*—Townsend and Townsend and Crew LLP

(57) ABSTRACT

A method for a computer system includes displaying a toolbar region with user selectable icons on a display, positioning a cursor on the display over the toolbar region, and receiving a first command from the user while the cursor is positioned over the toolbar region, wherein the first command from the user comprises pressing and holding of a button on a user input device, displaying additional user selectable icons on the display in response to the first command, positioning the cursor on the display over one user selectable icon, and receiving a second command from the user while the cursor is positioned on the one user selectable icon, wherein the second command from the user comprises releasing the button on the user input device, wherein the one user icon and the user selectable icons are then displayed in the toolbar region in response to the second command.

26 Claims, 7 Drawing Sheets

TOOLBAR SLOT METHOD AND APPARATUS

CROSS-REFERENCES TO RELATED APPLICATIONS

The present invention is related to and incorporates by reference for all purposes U.S. patent application Ser. No. 10/841,804, filed May 6, 2004, titled Integrated Object Bend, Squash and Stretch Method and Apparatus.

BACKGROUND OF THE INVENTION

The present invention relates to computer animation. More specifically, the present invention relates to enhanced user interfaces for object creation and animation.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer aided animation (CAA) industry was Pixar, dba Pixar Animation Studios. Over the years, Pixar developed and offered both computing platforms specially designed for CAA, and Academy-Award® winning rendering software known as RenderMan®.

Over the years, Pixar has also developed software products and software environments for internal use allowing users (modelers) to easily define object rigs and allowing users (animators) to easily animate the object rigs. Based upon such real-world experience, the inventors of the present invention have determined that additional features could be provided to such products and environments to facilitate the object definition and animation process. One such feature includes methods and apparatus for facilitating the definition of custom toolbars according to individual user preference.

The inventors of the present invention recognize that many software packages provide a method for users to define a customize display of operational controls via a "toolbar" mechanism. As is known, toolbars are typically a collection of commands, actions and/or functions that are displayed to the user in a separate window on a computer display. To customize such toolbars, the inventors have determined that many packages require a user to work in an highly disruptive way to add commands to a toolbar. For example, in the Microsoft Word program, a user selects from the main application menu bar the "View" drop-down menu, select the "toolbars" drop-down menu, and then selects the "customize" button. After this, a dialog window provides the user with a scrolling list of the possible system commands. To add a command to a toolbar, the user drags the command from the list and on to the toolbar to be customized. After this, the user manually closes the dialog window, for example, with a left mouse button click.

FIGS. 1A-B illustrate a typical process for customizing a toolbar. For example, in a toolbar 100, icons 110 typically do not represent the functionality required by a user. Accordingly, to add the functionality to the toolbar, users open the dialog box or function window via the drop-down menu. As illustrated in the example in FIG. 1A, a customization dialog 120 is presented to the user. Next, the user selects a command from list 130, and drags it to a particular location on toolbar 100. As illustrated in FIG. 1B, in response to the customization, toolbar 100 will then include the requested icon 140 and functionality. Finally, the user manually clicks on button 150 using a left mouse button, for example, to close the open dialog box.

The inventors of the present application have discovered that these methods are very inefficient for object animators and object modelers and for any users who need to frequently change the function of the toolbar. Although these method for customizing a toolbar may be adequate for most users, in the present applications, because the users change tasks and modes frequently, these customization methods are highly disruptive. As illustrated, each time a function needs to be added to a toolbar, the user must leave the primary work space, navigate to the menu structure, open a customization window on top of the primary work space, perform the customization, save the customization, select the added function on the toolbar, then manually close the customization window on top of their primary work space.

FIGS. 2A-B illustrate a compressed toolbar example. FIG. 2A illustrates a toolbar 200 for a conventional drawing program. In this example, when a user clicks upon an icon location 210 using a right mouse button, for example, functions/icons 220 that share the same icon location 210 are displayed to the user, as illustrated in FIG. 2B. Next, the user clicks upon one of icons 220 using a left mouse button, for example, to select that icon for icon location 210 on toolbar 200. After selection of one of icons 220, that icon replaces the icon originally displayed.

The compressed toolbar is used to save screen space. In this example, if toolbar 200 were enlarged to show all the "sub-icons" that are selectable at all of the icon locations, toolbar 200 would take up a large portion of the screen. Accordingly, by having one icon location 210 associated with several pre-defined icons 220, toolbar 200 is thus compressed.

Drawbacks to the compressed toolbar technique include that a user is limited to the pre-defined functions ("sub-icons") associated with each icon location. Another drawback is that the pre-defined functions can only be selected from particular icon locations. For instance, icon location 210 may represent a pencil function. In FIG. 2B, when icon location 210 is expanded, pre-defined functions are illustrated, such as pencil drawing, pen drawing, and eraser. These pre-defined functions are fixed and only available when the user selects icon location 210 in the toolbar. Another drawback is that, the user has to give-up one function (icon) in order to add another function (icon). For example, the only way to add an eraser function (icon) to the toolbar is to lose a pencil function (icon) from the toolbar. Further, to add the pencil function, the toolbar loses the eraser function. Accordingly, the compressed toolbar technique has significant drawbacks.

In light of the above, the inventors of the present invention have determined that improved methods for adding functionality to toolbars are needed without the drawbacks illustrated above.

BRIEF SUMMARY OF THE INVENTION

The present invention relates to computer animation. More specifically, the present invention relates to enhanced user interfaces for object creation and animation.

The present embodiments disclose methods and user interfaces for adding virtually any command as a button on a toolbar, without leaving the primary workspace. This functionality can be performed with a single click, hold and release of a button on a mouse or a stylus or a keystroke on a keyboard, etc. Specific embodiments allow the user to customize the functionality of toolbars by making the application commands available for any position on the toolbar. The commands may be all commands available in the program or environment, a subset of commands, a dynamic list of commands, a hierarchical list of commands, and the like. Additionally, embodiments ephemerally display the list of available commands so as to reduce the amount of primary workspace occluded, and the number of actions required by a user.

According to one aspect of the invention, a method for a computer system is disclosed. Various techniques includes displaying a toolbar region comprising a plurality of user selectable icons on a display, positioning a cursor on the display over the toolbar region, in response to user input, and receiving a first command from the user while the cursor is positioned on the display over the toolbar region, wherein the first command from the user comprises pressing and holding of a button on a user input device. The method may also include displaying a plurality of additional user selectable icons on the display in response to the first command, positioning the cursor on the display over one additional user selectable icon of the plurality of additional user selectable icons, and receiving a second command from the user while the cursor is positioned on the one additional user selectable icon, wherein the second command from the user comprises releasing the button on the user input device. The one additional user selectable icon and the plurality of user selectable icons are then displayed in the toolbar region in response to the second command.

According to one aspect of the invention, a graphical user interface is disclosed. The graphical user interface includes a first portion configured to display a plurality of user selectable icons, and a second portion configured to display a plurality of displayable user selectable icons. In various interfaces, when a user makes a first selection while a cursor is positioned over the first portion, the second portion is displayed, and when the user makes a second selection while the cursor is positioned over one of the plurality of displayable user selectable icons, the one displayable user selectable icon and the plurality of user selectable icons are displayed in the first portion. The first selection comprises holding a button down on a user input device, and the second selection comprises releasing the button on the user input device.

According to one aspect of the invention, a computer program product for a computer system is disclosed. The product includes a tangible media that may include code that directs the processor to display a first plurality of icons on a toolbar region in a display, code that directs the processor to receive a indication from a user to add at least one icon on the toolbar region, wherein the indication comprises holding down a button, and code that directs the processor to determine a second plurality of icons in response to data displayed on a display. Additionally, the media may include code that directs the processor to display the second plurality of icons on the display, code that directs the processor to receive a selection from the user of one icon from the second plurality of icons on the display, wherein the selection from the user comprises releasing of the button, and code that directs the processor to display the one icon on the toolbar region. The tangible may be a magnetic, optical, or physical recording media.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1A:
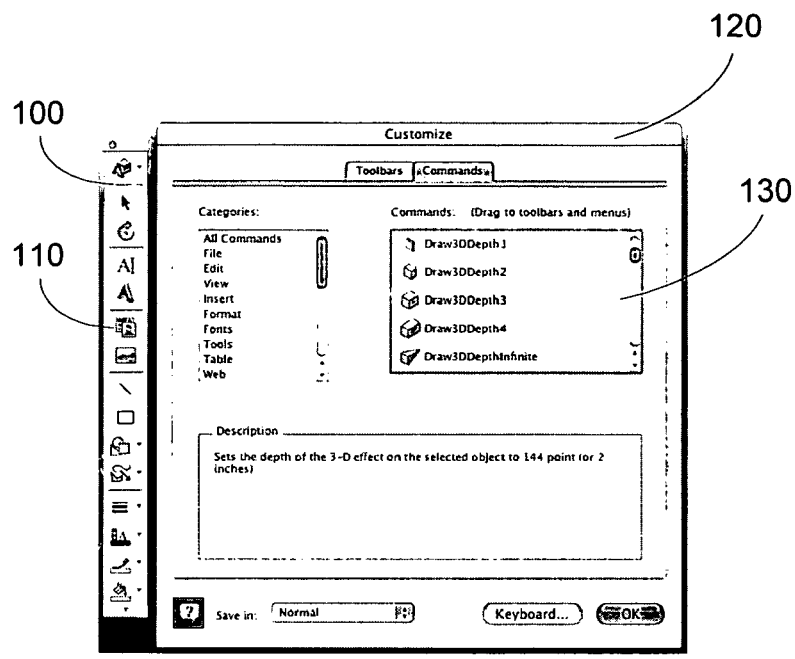
FIGS. 1A-B illustrate a typical process for customizing a toolbar.
Figure 1B:
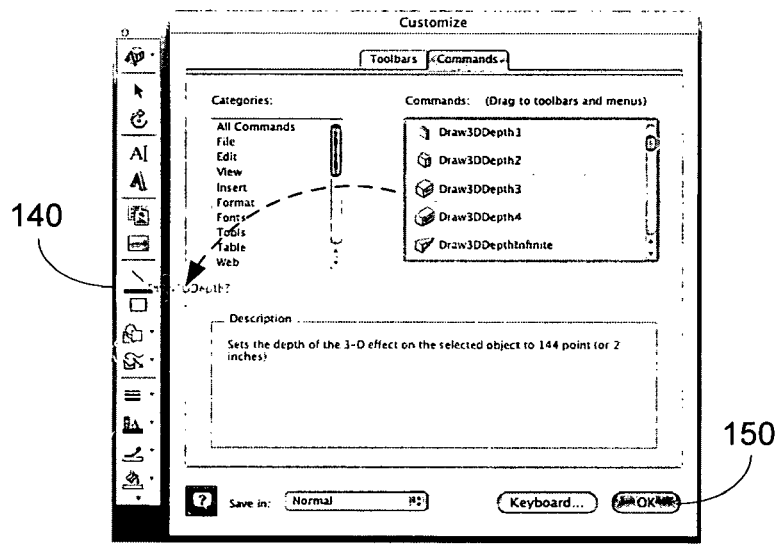
Figure 2A:
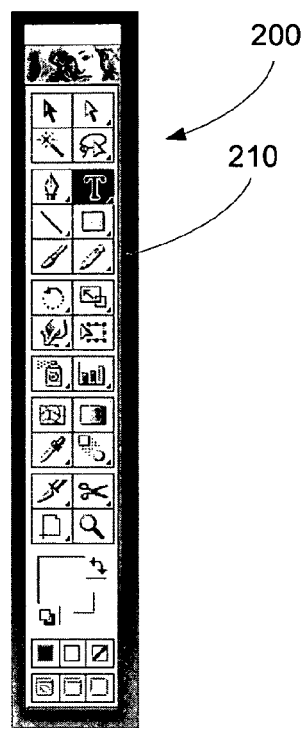
FIGS. 2A-B illustrate a compressed toolbar example.
Figure 2B:
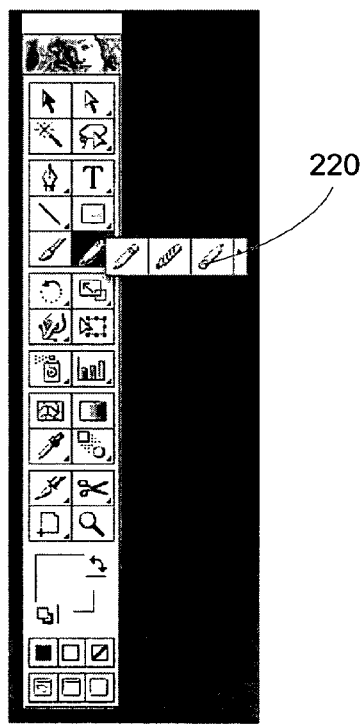
Figure 3:
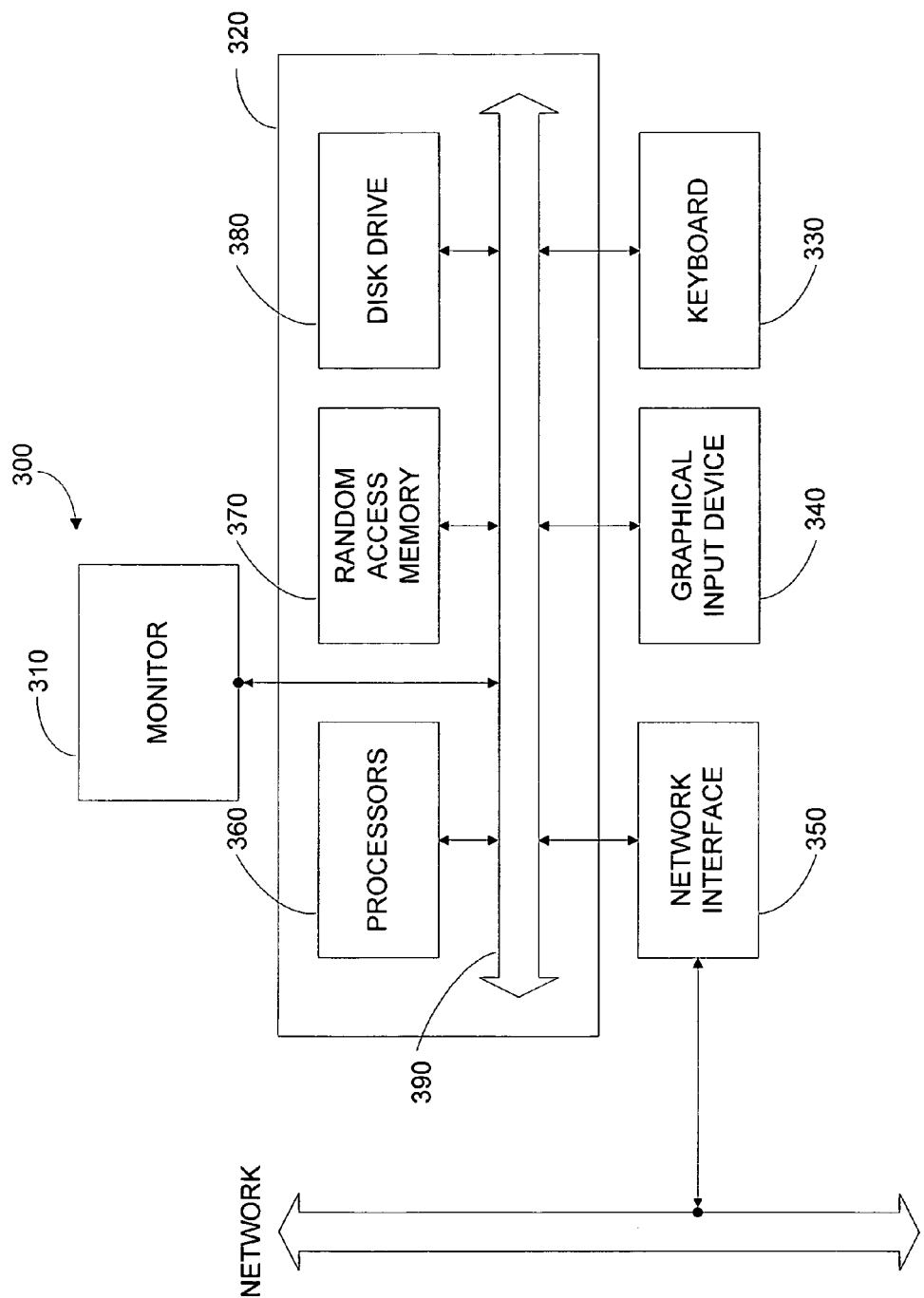
FIG. 3 illustrates a block diagram of a system according to one embodiment of the present invention.

FIG. 3 is a block diagram of typical computer system 300 according to an embodiment of the present invention.

In the present embodiment, computer system 300 typically includes a monitor 310, computer 320, a keyboard 330, a user input device 340, a network interface 350, and the like.

In the present embodiment, user input device 340 is typically embodied as a computer mouse, a trackball, a track pad, wireless remote, drawing tablet, joystick, an integrated display and tablet (e.g. Cintiq by Wacom), voice command system, eye tracking system, and the like. User input device 340 typically allows a user to select objects, icons, text and the like that appear on the monitor 310 via pressing a button or the like.

Embodiments of network interface 350 typically include an Ethernet card, a modem (telephone, satellite, cable, ISDN), (asynchronous) digital subscriber line (DSL) unit, and the like. Network interface 350 are typically coupled to a computer network as shown. In other embodiments, network interface 350 may be physically integrated on the motherboard of computer 320, may be a software program, such as soft DSL, or the like.

Computer 320 typically includes familiar computer components such as a processor 360, and memory storage devices, such as a random access memory (RAM) 370, disk drives 380, and system bus 390 interconnecting the above components.

In one embodiment, computer 320 is a PC compatible computer having one or more microprocessors such as PentiumIV™ or Xeon™ microprocessors from Intel Corporation. Further, in the present embodiment, computer 320 typically includes a LINUX-based operating system.

RAM 370 and disk drive 380 are examples of tangible media for storage of data, audio/video files, computer programs, scene descriptor files, object data files, shader descriptors, a rendering engine, output image files, texture maps, displacement maps, object creation environments, animation environments, asset management systems, databases and database management systems, and the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In the present embodiment, computer system 300 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 3 is representative of computer systems capable of embodying the present invention. It will be readily apparent to one of ordinary skill in the art that many other hardware and software configurations are suitable for use with the present invention. For example, the computer may be a desktop, portable, rack-mounted or tablet configuration. Further, the use of other micro processors are contemplated, such as Pentium™ or Itanium™ microprocessors; Opteron™ or AthlonXP™ microprocessors from Advanced Micro Devices, Inc; PowerPC G4™, G5™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 4:
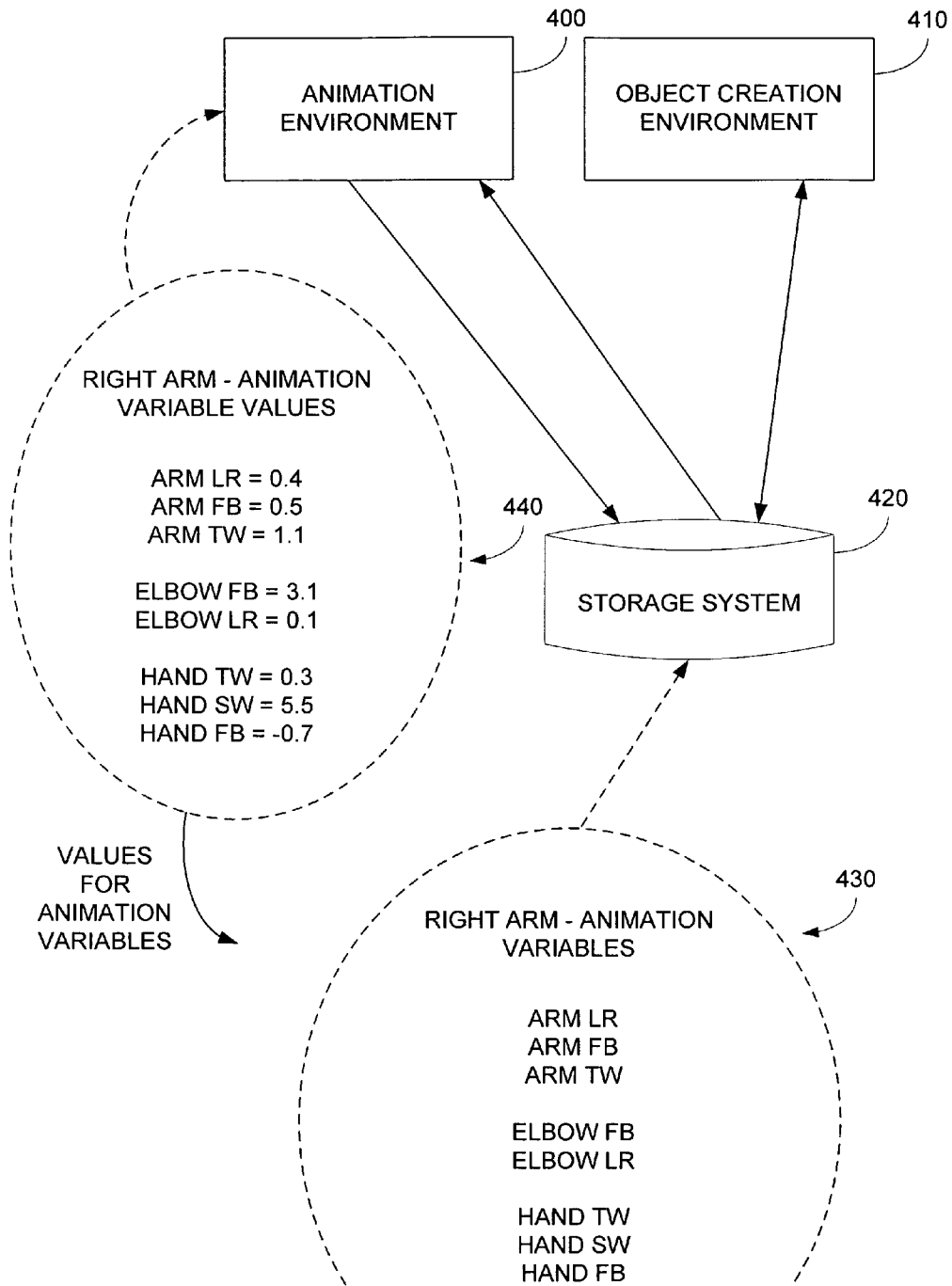
FIG. 4 illustrates a block diagram of an embodiment of the present invention.

FIG. 4 illustrates a block diagram of an embodiment of the present invention. Specifically, FIG. 4 illustrates an animation environment 400, an object creation environment 410, and a storage system 420.

In the present embodiment, object creation environment 410 is an environment that allows users (modellers) to specify object articulation models, including armatures and rigs. Within this environment, users can create models (manually, procedurally, etc.) of objects and specify how the objects articulate with respect to animation variables (Avars). In one specific embodiment, object creation environment 410 is a Pixar proprietary object creation environment known as "Gepetto." In other embodiments, other types of object creation environments can be used.

In the present embodiment, the object models that are created with object creation environment 410 may be used in animation environment 400. Typically, object models are heirarchically built. The heirarchical nature for building-up object models is useful because different users (modellers) are typically assigned the tasks of creating the different models. For example, one modeller is assigned the task of creating a hand model, a different modeller is assigned the task of creating a lower arm model, and the like. Accordingly, by dividing-up the responsibility for object creation, the object creation process time is greatly reduced.

In the present embodiment, animation environment 400 is an environment that allows users (animators) to manipulate object articulation models, via the animation variables (Avars). In one embodiment, animation environment 400 is a Pixar proprietary animation enviroment known as "Menv," although in other embodiments, other animation environments could also be adapted. In this embodiment, animation environment 400 allows an animator to manipulate the Avars provided in the object models (generic rigs) and to move the objects with respect to time, i.e. animate an object.

In other embodiments of the present invention, animation environment 400 and object cration environment 410 may be combined into a single integrated environment.

In FIG. 4, storage system 420 may include any organized and repeatable way to access object articulation models. For example, in one embodiment, storage system 420 includes a simple flat-directory structure on local drive or network drive; in other embodiments, storage system 420 may be an asset management system or a database access system tied to a database, or the like. In one embodiment, storage system 420 receives references to object models from animation environment 400 and object creation environment 410. In return, storage system 420 provides the object model stored therein. As illustrated, object models typically specify one or more animation variables 430. In response, via animation environment 400, the user may specify values 440 for animation variables 430 either graphically, via keyboard, or the like.

Figure 5:
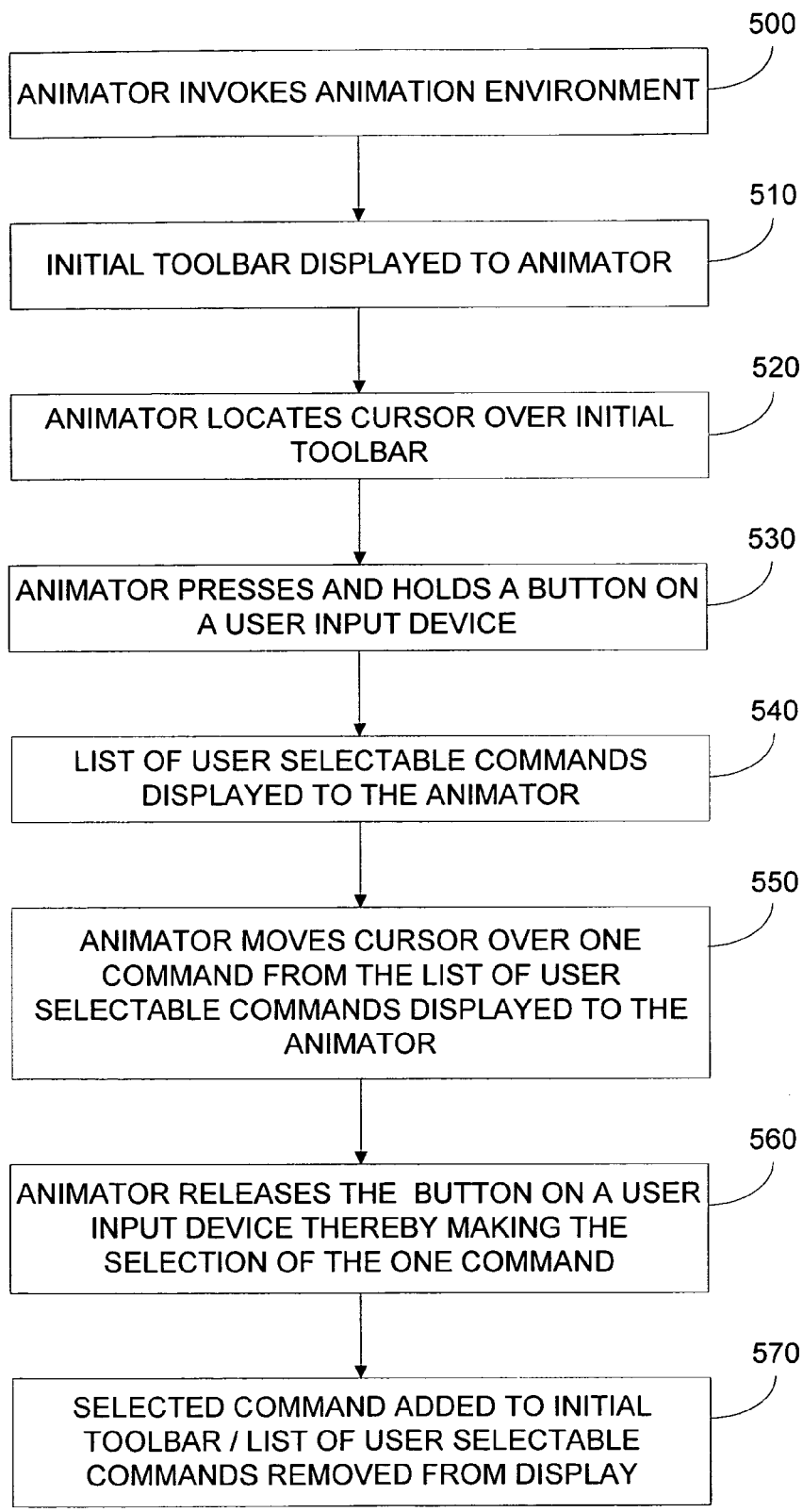
FIG. 5 illustrates a block diagram of a flow chart according to embodiments of the present invention.

FIG. 5 is a block diagram according an embodiment of the present invention. Initially, a user invokes a working environment, step 500. Embodiments of the present invention are implemented in Pixar's animation environment 400 called Menv and Pixar's object creation environment 410 called Gepetto. However, in light of the present disclosure, the inventors can foresee embodiments of the present invention being applied to virtually any program where toolbars and menus are customized by users. For example, embodiments maybe used in Microsoft Office products, Adobe products, and the like, to greatly enhance the process of customization.

Next, an initial toolbar is presented to the user, step 510. In one embodiment, an initial toolbar may be a default or predefined toolbar provided by the working environment or program. In another embodiment, the initial toolbar may include one or more toolbars specified by the user. These toolbars may have been previously customized and saved by the user.

In the present embodiment, to add functionality to an initial toolbar, the user positions a cursor above the initial toolbar, step 520, and presses the left button (selection button) on their mouse, step 530. In some embodiments, the users presses and holds the selection button (e.g. the left mouse button) down until released in step 560 below. In other embodiments, other methods for user selection are contemplated, for example, double clicking a barrel button or a tip button on a stylus, clicking a right mouse (non-selection button) button, clicking a non-selection button of another graphical input device, making a gesture, and the like.

In other embodiments, different methods for performing the functions of steps 520 and 530 are contemplated. For example, speaking a voice command, typing a hotkey or a key combination on a keyboard, using "sticky" keys and the like.

In embodiments of the present invention, in response to the selection in step 530, a list or menu of user selectable commands is presented to the user, step 540. The commands may have text labels, may have icons, or combinations thereof. In one embodiment, the list may be a horizontal row of selectable icons, a vertical column of selectable icons, an array of selectable icons, or the like. In one embodiment, the commands presented in the list may be a universe of commands provided by the software environment. In another embodiment, the commands presented in the list may be reduced by a user to commands the user wishes, e.g. only 40 commands not 300. As an example, the user may perform a certain group of commands (e.g. 12 commands) repeatedly, however, the number of icons that would be required exceed the toolbar space desired by the user (e.g. 8 toolbar slots). Accordingly, in one embodiment, the user specifies the group of commands (e.g. 12) that pops up on the display in this step in response to the selection in step 530.

In another embodiment, the commands that are presented to the user may be partially context sensitive, based upon the type of objects the user is working on. For example, if an object has an "integrated squash and stretch with volume preservation mode," as described in above-referenced co-pending U.S. patent application, the "integrated squash and stretch with volume preservation" tool button will be displayed on the menu; if the object does not have the feature, the tool button will not be displayed. As another example, direct-manipulation bend and bow functionality, described in the above U.S. application, may or may not be supported by objects the user is working on. Accordingly, when the object supports the direct-manipulation bend and bow functionality, the menu may include a "direct-manipulation bend and bow" tool button. As additional examples, for specific items in a scene, including controls for props, lights, and the like, the list of commands presented to the user may vary. For example, when the user selects a light model in a scene, commands that may be added to a toolbar may include: cut-on, cut-off, barn door, drag light, intensity, frustum length, fall-off, diffuse, specular, rim, and the like, which are very light model specific.

In other embodiments, the principles may also apply to more conventional two-dimensional environments. For example, if there are multiple overlapping objects, commands or icons that may automatically be included in the pop-up list may include ordering commands, such as "bring to front," "send to back," "up one level," "down one level," and the like may appear. In such examples, if there is a single object or if objects are not overlapping, the ordering commands may not appear. As an additional example, if multiple objects are present in the scene, commands that may automatically be included include distribution commands (e.g. "evenly distribute," "place adjacent." and the like). When there is a single object, the distribution commands may be suppressed.

In other embodiments, if there are multiple objects with objects including some unique modes, the list of user selectable commands may be the union of the modes of the multiple objects. For example, if a first object in a scene has an integrated squash and stretch with volume preservation mode, and a second object in a scene has a direct-manipulation bend and bow mode, the menu displayed to the user will have tool buttons representing the both the manipulation modes.

In still other embodiments, different ways to dynamically determine the commands that are in the pop-up menu are contemplated based upon the user's preferences, based upon the type of objects currently in the working environment, the frequency of usage, and the like. In other embodiments, the user may query for what modes are available for objects in a scene, or the like.

In some embodiments, the user then moves the cursor over one command from the list of user selectable commands the user wishes to add to the toolbar, step 540. In some embodiments, this occurs while the mouse button is still depressed. In other embodiments, the user may use arrow keys on a keyboard, or the like to select the command from the list.

In embodiments of the present invention, a hierarchical structure may be added to the list of user selectable commands. For example, the menu or list of user commands in the pop-up menu may initially have categories of commands. When the user moves the cursor over one command category, an additional pop-up menu appears that includes additional user selectable commands that are within the command category. In such embodiments, the user can navigate up and down the hierarchical command structure by simply moving the cursor over the desired command categories. In some embodiments of the present invention, these pop-up menus and sub-menus, etc. are also ephemeral, i.e. they automatically close after the user moves-off the list of user selectable commands. Additionally, they also automatically close after the user makes a selection in the following step.

In the example in FIG. 5, the user next makes a selection of the command to add to the toolbar, step 560. In one embodiment, the user presses and holds a mouse button down, such as the left mouse button (selection button) to view the list of user selectable commands in step 530. The user then navigates to the command they wish to add, and then the user releases the mouse button to make the selection. In other embodiments, to select the command, the user may do so in any number of conventional methods, such as clicking a button on a user input device, striking a key on a keyboard, speaking a voice command, and the like.

Next, the selected command is added to the toolbar, step 570. In embodiments of the present invention, an icon or text button associated with the command is added to an empty location on the toolbar. In some embodiments, the toolbars may include as many icons as desired. In other embodiments, a limited number of spaces are specified, accordingly, if the toolbar does not have an empty location, another icon may be "bumped" from the toolbar. The determination of which icon is bumped may be based upon frequency of usage of icons in the toolbar, user selection, or the like. In embodiments of the present invention, the pop-up list of commands is automatically removed from the display after the user makes the selection. Accordingly, the user does not have to specifically select an "ok" button, or the like.

In embodiments of the present invention, the user may give customized toolbars names and save and recall the icons included in the toolbars. It is contemplated that different users will have different icons, depending upon the user's requirements, the objects in the scene, and the like. In other embodiments, toolbars may be customized for users within a common working groups, organization, or the like. Additionally, sub-sets of toolbars may also be saved and recalled. For example, a set of icons related to a particular character, such as "Helen" controls may also be saved and reused. The icons may include character specific functionality, such as "integrated stretch and squash with volume preservation" functionality. In other examples, sets of icons related to "hand" controls, "bi-pedal" character controls, and the like may be saved and reused; and the like. Toolbars, and the like may also be "rolled-up" and "torn away" on the graphical user interface.

FIGS. 6A-F illustrate graphical user interfaces according to embodiments of the present invention. In some embodiments of the present the graphical user interface 600 is a user interface within animation environment 400 and/or object creation environment 410, or the like.

Figure 6A:
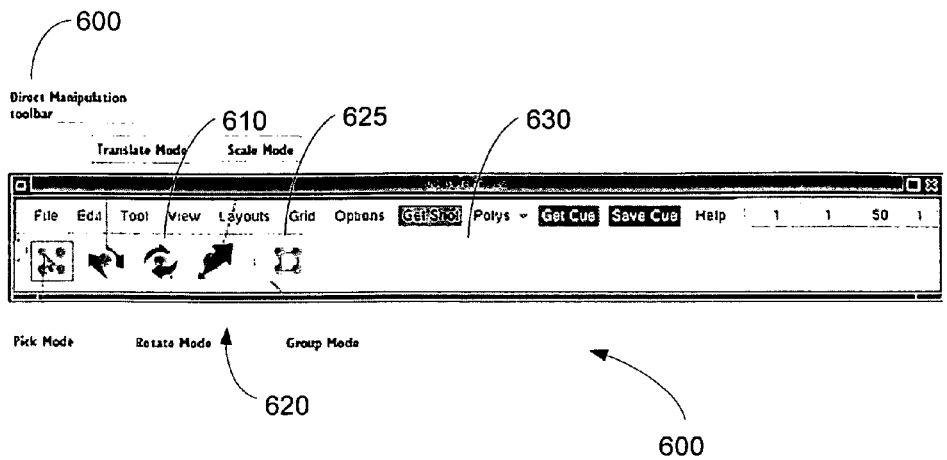
FIGS. 6A-F illustrate graphical user interfaces according to one embodiment of the present invention.

In FIG. 6A, a number of functional object "modes" are illustrated. Within the environments above, users (e.g. animators, modelers) often select different modes to manipulate the object models (e.g. rigs) or to view the models in different ways. In the example in FIG. 6, a toolbar 600 includes a number of locations 620 including icons that allow users to execute the functions specified on the object. In this example, the modes include a pick mode (e.g. for selecting objects), a translate mode (e.g. for moving objects), rotate mode (e.g. for rotating the objects) at location 610, a scale mode (e.g. for changing the scale of objects), and a grouping mode 625 (e.g. for allowing manipulation of a group of objects). In various embodiments, other modes are contemplated such as a jiggle mode, integrated squash and stretch with volume preservation mode, direct-manipulation object bend and bow mode, and the like.

Additionally, toolbar 600 includes user-selectable region 630. In the present embodiment, users can invoke commands by selecting an icon or text displayed in toolbar 600 in any conventional way, such as a left-button mouse click (selection button). In other embodiments, toolbars are directly mapped to keys on a keyboard. As an example, icons on a toolbar may be arranged horizontally across the screen, and selection of one of the QWERTY keys on the keyboard automatically invoke a corresponding mode.

Figure 6B:
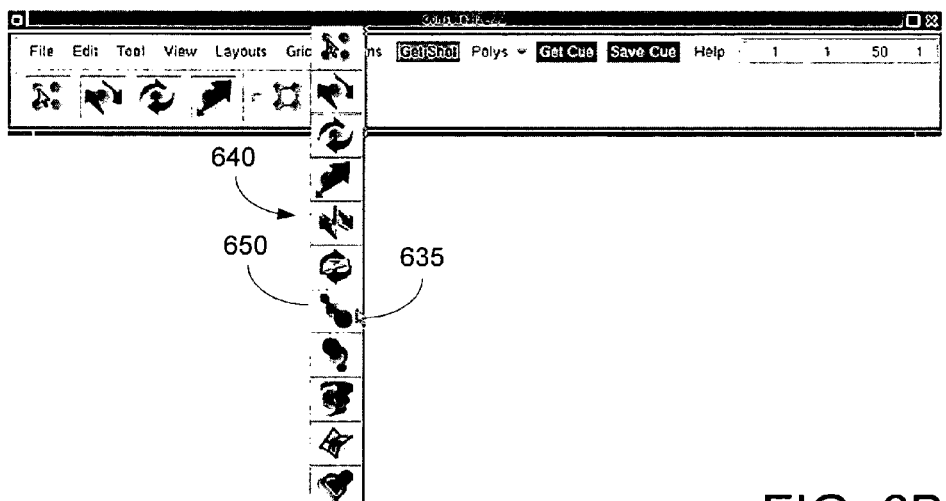

In FIG. 6B, the user has positioned a cursor 635 over user-selectable region 630 on toolbar 600 and depressed the left mouse button (selection button). In response, according to one embodiment, a list 640 of user selectable commands or icons are presented to the user. In this case, list 640 is a list of all assignable mode commands for the scene. In the present example, the list is generated by the system generating a query of the all of the models in a "shot" (series of related images) and collating the intersection of all possible modes. In some embodiments, the icons displayed in list 640 may be set or pre-defined by the user, may be dynamically determined based upon data in the "shot," based upon frequency of usage, or the like.

In FIG. 6B, the user has moved cursor 635 on top of icon 650, representing an integrated squash and stretch with volume preservation mode. In the present example, when the user releases the selection button, icon 650 will be added to toolbar 600. In other embodiments, other methods for selecting icon 640 are contemplated, for example, via arrow keys and other keyboard input, voice command, additional right or left button mouse clicks, and the like.

Figure 6C:
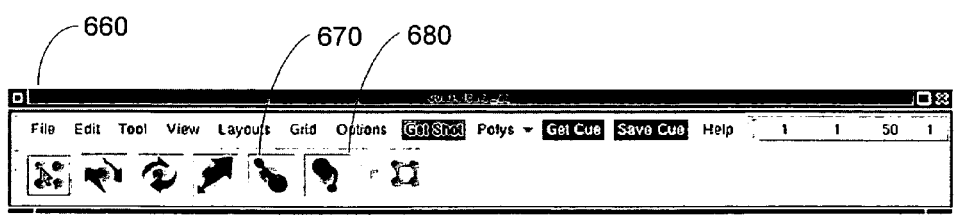

In the example in FIG. 6C, the user has added two mode commands to toolbar 600 using the disclosed techniques to form toolbar 660. Specifically, as can be seen, the user has added icon 670, representing an integrated squash and stretch with volume preservation command, and icon 680, representing a direct-manipulation bend and bow command.

Figure 6D:
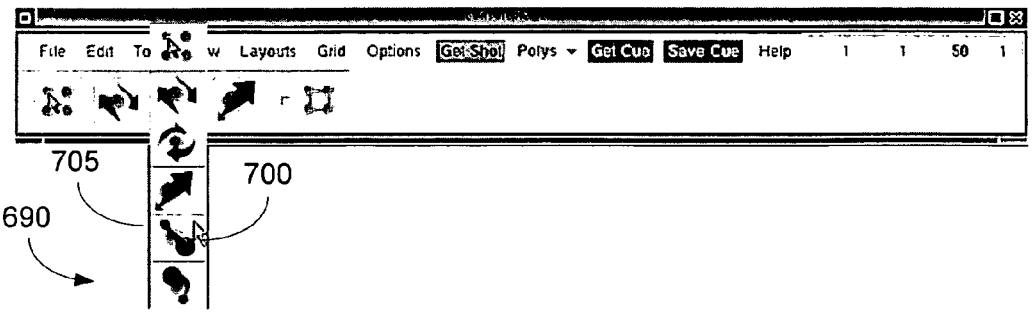
Figure 6E:
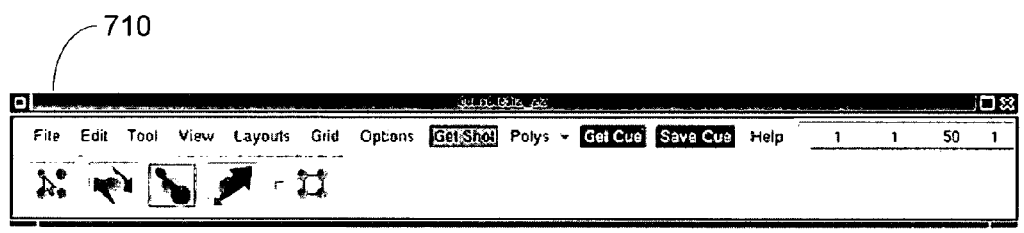
Figure 6F:
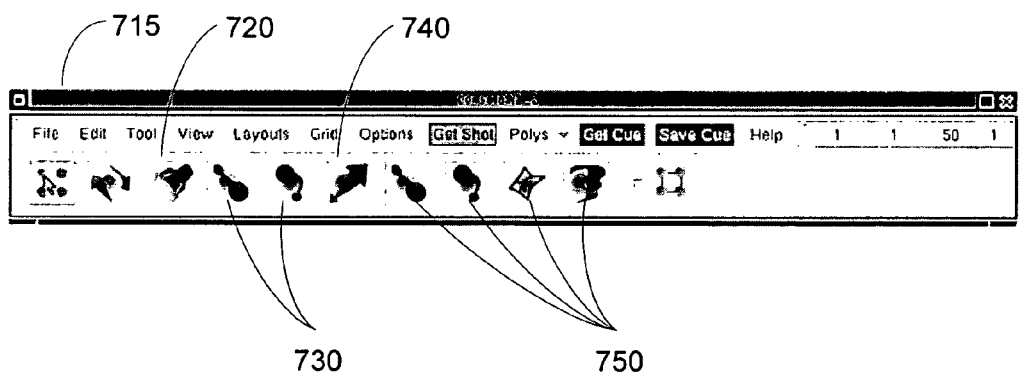

In some embodiments, if a cursor is positioned over a specific location in toolbar 600, such as location 610, when the process described above is performed, a user-selected icon may replace the icon already at location 610. More specifically, FIG. 6D illustrates an example where a list 690 of user selectable commands are presented to the user while cursor 700 is positioned at location 610 (FIG. 6A) in toolbar 600 and depresses the (left) selection button, or the like. Next, when the user releases the (left) selection button while cursor 700 is positioned over icon 705, the "send to back" mode then replaces the rotate mode icon in the resulting menu 710 as can be seen in FIG. 6E.

In other embodiments of the present invention, icons added to a menu may replace existing icons, may be inserted between existing icons, may be inserted before or after existing icons, or the like. For example, in FIG. 6E, a toolbar 715 is illustrated. In this example, compared to toolbar 600 in FIG. 6A, icon 720 replaces the existing rotate icon in location 610, icons 730 were added before existing icon 740, and icons 750 were added after existing icon 740.

In embodiments of the present invention, particular icons may have restricted properties. For example, in FIG. 6A, the icon 625 on toolbar 600 is a Group Mode command (e.g. a specification for a mode that allows the user to treat multiple objects as a group—rather than as a collection of individuals for functions such as rotations, scales, and the like.)

In various embodiments, certain icons may not be removed from toolbar 600 and are a persistent part of Direct Manipulation toolbar 600. In other embodiments, restrictions may also be placed on icon positions. For example, in various embodiments, icon 625 is always at a particular location in toolbar 600, such as the last mode button on toolbar 600; a pick command is always at the first slot of toolbar 600, or the like. In other embodiments, other types of restrictions on icons are contemplated. In embodiments of the present invention, the restrictions on icons may be set by a programmer, by the user, or the like.

In embodiments of the present invention, users can set the maximum number of icons that are displayed on the toolbar at a time. Additionally, toolbars can be resized, the shaped changed (i.e. row of icons to grid of icons, using conventional window drag techniques, torn off, and the like.

Using the embodiments described above, users at Pixar can easily define and redefine toolbar functionality. Within Pixar, users have anecdotally noticed an increase in productivity within software environments using embodiments of the present invention.

Many changes or modifications are readily envisioned. In light of the above disclosure, one of ordinary skill in the art would recognize that the concepts described above may be applied to any number of environment. For example, the toolbar concepts may be applied to any number of software programs where customization and addition of icons to toolbars is desired. Other combinations of embodiments are also contemplated.

In embodiments of the present invention, various methods for initiating the process and selecting commands is contemplated, for example, hotkeys may be associated with individual slots of a toolbar to increase the speed at which a user can switch between the modes. Hotkeys may also be associated with particular user commands, and the like. Additionally, Hotkeys may be assigned to hide toolbars, resize toolbars, revert toolbars, and the like. In embodiments of the present invention, users can name and save toolbar configurations for later use. Access to saved toolbars may be provided via pull-down menu, or other conventional technique.

In embodiments of the present invention, reference has been made to a "selection" button of a mouse. The selection button may vary in actual implementation. For example, for Apple brand computers, the selection button is the default mouse button; for stylus computing, the selection button is typically the tip button; for traditional multi-buttoned mice, for right-handed users, the selection button is typically the left mouse button, and for left-handed users, the selection button is typically the right mouse button. "Chording" of mouse buttons may also be performed. Accordingly, the description of specific buttons in the above disclosure is merely exemplary and does not foreclose the scope of embodiments.

The above embodiments disclose a method for a computer system, a computer system capable of performing the disclosed methods, and graphical user interfaces capable of performing the disclosed methods. Additional embodiments include computer program products on tangible media including software code that allows the computer system to perform the disclosed methods, and the like.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system comprises:
   displaying a toolbar region comprising a plurality of initially displayed user selectable icons, referred to as the first plurality of icons, on a display wherein the first plurality of icons are associated with a particular toolbar;
   positioning a cursor on the display over the toolbar region, in response to user input;
   receiving a first command from the user while the cursor is positioned on the display over the toolbar region, wherein the first command from the user comprises pressing a button on a user input device;
   in response to the first command and without opening a dialog box, displaying a plurality of additional user selectable icons, referred to as the second plurality of icons, on the display in response to the first command wherein the second plurality of icons includes one or more icons not previously associated with the particular toolbar;
   positioning the cursor on the display over one additional user selectable icon of the second plurality of icons wherein the one icon is one of the one or more icons not previously associated with the particular toolbar;
   receiving a second command from the user while the cursor is positioned on the one additional user selectable icon, wherein the second command from the user comprises releasing the button on the user input device; and
   displaying the one additional user selectable icon and the entire first plurality of icons in the toolbar region in response to the second command.

2. The method of claim 1 further comprising automatically removing a display of the second plurality of icons from the display in response to the second command.

3. The method of claim 1 wherein the first command is selected from the group: pressing of a button on a mouse, pressing a button on a stylus, pressing a key on a keyboard, speaking a voice command.

4. The method of claim of claim 1 wherein the one additional user selectable icon comprises data selected from the group: images, and text.

5. The method of claim 1 wherein displaying the second plurality of icons on the display in response to the first command comprises displaying the second plurality of icons on the display in a manner selected from the group: a row, a column, rows and columns.

6. The method of claim 1 wherein the second plurality of icons includes user selectable icons already in the first plurality of icons.

7. The method of claim 1 further comprising:
   receiving a third command from the user while the cursor is positioned on the one additional user selectable icon in the toolbar region; and performing an action associated with the one additional user selectable icon.

8. A graphical user interface comprises:
   a first portion configured to display a first plurality of user selectable icons wherein the first plurality of user selectable icons are associated with a particular toolbar; and
   a second portion configured to display a second plurality of displayable user selectable icons wherein at least one of the icons in the second plurality is not previously associated with the particular toolbar;
   wherein:
     when a user makes a first selection while a cursor is positioned over the first portion, the second portion is displayed without opening a dialog box;
     when the user makes a second selection while the cursor is positioned over one of the second plurality of displayable user selectable icons that is not previously associated with the particular toolbar, the first portion is also configured to display the one displayable user selectable icon from the second plurality of icons while continuing to display the entire first plurality of user selectable icons that were displayed prior to the user making the first selection.

9. The graphical user interface of claim 8 wherein the second portion overlaps a portion of the first portion.

10. The graphical user interface of claim 8 wherein the plurality of displayable user selectable icons are positioned in the second portion in a manner selected from the group: a row, a column, rows and columns.

11. The graphical user interface of claim 8 wherein the first selection comprises one of the group: pressing of a mouse button, pressing of a stylus button, pressing of a keyboard key, speaking a voice command.

12. The graphical user interface of claim 8 wherein the second portion is automatically closed after the user makes the second selection.

13. The graphical user interface of claim 8 wherein the second plurality of displayable user selectable icons includes user selectable icons also in the first plurality of user selectable icons.

14. A computer program product residing on a computer-readable tangible media for a computer system includes:
   code that directs the processor to display a first plurality of icons on a toolbar region in a display;
   code that directs the processor to receive an indication from a user to add at least one icon on the toolbar region, wherein the indication comprises a first event;
   code that directs the processor to determine a second plurality of icons that includes at least one icon that is determined in response to data currently being displayed on a display, wherein (a) the data currently being displayed includes data of a given type, (b) the at least one icon is suitable for operating on at least a portion of the data of the given type that is currently being displayed, and (c) the at least one icon is not suitable for operating on data of at least one other type that is different from the given type;
   code that directs the processor to display the second plurality of icons on the display;
   code that directs the processor to receive a selection from the user of one icon from the second plurality of icons on the display, wherein the selection from the user comprises a second event; and
   code that directs the processor to display the one icon while continuing to display the first plurality of icons on the toolbar region.

15. The computer program product of claim 14 wherein the code that directs the processor to display the one icon on the toolbar region comprises code that directs the processor to display the one icon and the entire first plurality of icons on the toolbar region.

16. The computer program product of claim 14 wherein the first event comprises one of the following: pressing a mouse button, pressing a stylus button, pressing a stylus tip button, pressing a key on a keyboard, making a voice command.

17. The computer program product of claim 14 wherein the second event comprises one of the following: releasing a mouse button, releasing a stylus button, releasing a stylus tip button, releasing a key on a keyboard, pressing another key on the keyboard, making a voice command.

18. The computer program product of claim 14 further comprising:
   code that directs the processor to receive a first selection from the user of one icon from the first plurality of icons on the toolbar region; and
   code that directs the processor to enter a pre-determined mode in response to the first selection.

19. The computer program product of claim 18 further comprising:
   code that directs the processor to receive a second selection from the user of the one icon from the first plurality of icons on the toolbar region;
   code that directs the processor to determine a pre-determined third plurality of icons associated with the one icon;
   code that directs the processor to display the third plurality of icons associated with the one icon;
   code that directs the processor to receive a selection from the user of one icon from the third plurality of icons on the display; and
   code that directs the processor to display a modified plurality of icons on the toolbar region, wherein the one icon from the third plurality of icons replaces the one icon from the first plurality of icons on the toolbar region;
   wherein the third plurality of icons are a subset of the second plurality of icons.

20. The computer program product of claim 18
   wherein a third plurality of icons can be displayed on the display; and
   wherein the third plurality of icons includes icons not within the second plurality of icons.

21. The computer program product of claim 14 wherein:
   the first plurality of icons are associated with a toolbar; and
   the second plurality of icons are not pre-associated with the toolbar.

22. A method for a computer system wherein data and tools are displayed, and a user interacts with the data through the use of the tools and a displayed cursor, the method comprising:
   displaying a first plurality of icons representing tools on a toolbar region on a display;
   responding to a first cursor event in the toolbar region as an indication from the user to add at least one icon to the toolbar region;
   in response to the first cursor event and to the displayed data, determining a set of tools including at least one tool that reflects the currently displayed data, wherein (a) the currently displayed data includes data of a given type, (b) the at least one tool is suitable for operating on at least a portion of the currently displayed data of the given type, and (c) the at least one tool is not suitable for operating on data of at least one other type that is different from the given type;
   displaying a second plurality of icons including icons corresponding to the set of tools;
   responding to a second cursor event as a selection from the user of one icon from the second plurality of icons on the display; and
   displaying the one icon while continuing to display at least some of the first plurality of icons on the toolbar region.

23. The method of claim 22 wherein:
   the given type of data is data representing objects having unique modes; and
   determining the set of tools includes:
      determining whether the currently displayed data includes any objects having unique modes; and
      if yes, for at least some of the objects having unique modes, including in the set tools corresponding to the unique modes.

24. The method of claim 22 wherein:
   the given type of data is data representing a selected light model; and
   determining the set of tools includes:
      determining whether the displayed data includes the selected light model; and
      if yes, including in the set at least one light control tool specific to the light model.

25. The method of claim 22 wherein:
   the given type of data is data representing multiple objects; and
   determining the set of tools includes:
      determining whether the displayed data includes multiple objects; and
      if yes, including in the set at least one tool relating to changing the relative positions of the objects.

26. The method of claim 22 wherein:
   the first type of data is data representing multiple objects having multiple unique modes; and
   determining the set of tools includes:
      determining whether the displayed data includes multiple objects having unique modes; and
      if yes, including in the set tools corresponding to the multiple unique modes.

* * * * *